(12) United States Patent
Lascelles et al.

(10) Patent No.: US 6,314,835 B1
(45) Date of Patent: Nov. 13, 2001

(54) PIEZO-ELECTRIC DRIVE ARRANGEMENT FOR A HARMONIC DRIVE TRANSMISSION

(75) Inventors: Robert P. Lascelles, York, ME (US); Carmine Gabriel Tortora, Lowell; Erlendur Kristjansson, Salem, both of MA (US); Oliver Barth, Stuttgart (DE)

(73) Assignee: Harmonic Drive Technologies, Peabody, MA (US)

( * ) Notice: Subject to any disclaimer, the term of this patent is extended or adjusted under 35 U.S.C. 154(b) by 0 days.

(21) Appl. No.: 09/513,631

(22) Filed: Feb. 28, 2000

Related U.S. Application Data

(62) Division of application No. 09/241,257, filed on Feb. 1, 1999, now Pat. No. 6,029,543.

(51) Int. Cl.[7] ............................. F16H 33/00; F16H 35/00; F16H 37/00
(52) U.S. Cl. ................................................................ 74/640
(58) Field of Search ............................................... 74/640

(56) References Cited

U.S. PATENT DOCUMENTS 6,155,220 * 12/2000 Marriott ........................... 123/90.17

FOREIGN PATENT DOCUMENTS

19820514 * 3/1999 (DE) .
403103642 * 4/1991 (JP) ........................................ 74/640

* cited by examiner

*Primary Examiner*—Sherry Estremsky
*Assistant Examiner*—Tisha D. Lewis
(74) *Attorney, Agent, or Firm*—Don Halgren

(57) ABSTRACT

An apparatus and a method of rotatively empowering a harmonic drive transmission. The steps of the method include arranging a primary and a secondary cup-shaped flexspline co-axially within a rotatable rigid circular spline, and forming pivotable fingers in the secondary flexspline, biasing radially outwardly the pivotable fingers so as to contact and bias radially outwardly the primary flexspline in a sequential manner. The array of teeth between the primary flexspline and the circular spline engage one another to effect relative rotation therebetween. An array of piezo-electric elements is arranged in contact with the secondary flexspline and an adjacent non-rotating component. An electric current is sequenced through the piezo-electric elements to effect a dimensional change therein, thus to effect the biasing of the primary flexspline by the secondary flexspline.

9 Claims, 2 Drawing Sheets

PIEZO-ELECTRIC DRIVE ARRANGEMENT FOR A HARMONIC DRIVE TRANSMISSION

This application is a divisional of application Ser. No. 09/241,257 filed on Feb. 1, 1999 which is now U.S. Pat. No. 6,029,543.

BACKGROUND OF THE INVENTION

1. Field of the Invention

This invention relates to harmonic drive transmissions, and more particularly to a piezo-electric drive mechanism to rotatably empower that harmonic drive transmission.

2. Prior Art

Harmonic drive transmissions were originally called "strain-wave gearing" and were initially introduced by Musser in U.S. Pat. No. 2,906,143. Such original harmonic drive, strain-wave gearing comprised a rigid circular spline having "N" teeth, a flexspline having fewer than "N" teeth ("IN" being a positive integer) and being disposed within the circular spline, and a rotatable wave generator disposed in the flexspline to deform the flexspline into a lobed configuration, such as an oval shape, so as to force the flexspline into an engagement with the circular spline at two points on the major axis of the formed ovaloid.

The wave generator may include an oval cam plate and a bearing snugly mounted on the outer periphery of the cam plate. The outer bearing is matingly inserted into the flexspline so as to deform it to the peripheral contour of the cam plate. An input shaft attached to the cam plate provides rotation thereto, causing the ovaloid configuration of the flexspline to be correspondingly rotated. During such rotation, the circular spline is induced to rotate, relative to the flexspline, an amount proportional to the difference in the number of teeth between the flexspline and the circular spline. When an output shaft is arranged on either the flexspline or the circular spline, that output shaft is rotated very slowly in comparison to its input shaft. Such harmonic drive, strain-wave gearing has been utilized in machinery requiring a high reduction ratio.

There are instances where a small reduction ratio is required, for example, as low as about 50:1. In most cases, in harmonic drive systems, the wave generator is driven by an electric motor. Electric motors however, typically have speed limitations, both on the upper and lower ends. At the upper end of these ratios, the motors and their bearings and those bearings on the wave generator, may wear or burn out rapidly. At the low end of these reduction ratios, the motors will not work well. There is a trade-off between torque and speed in using an electrically driven harmonic drive transmission. High torque will not permit a highspeed output, and a low torque will not permit a low speed output.

It is an object of the present invention to provide a drive means for a harmonic drive transmission, which will satisfy the needs for high torque and high speed and/or low torque and low speed in a manner not found in the prior art.

It is yet a further object of the present invention to provide a harmonic drive transmission which eliminates the drawbacks typically found with wave generators and their bearings.

It is a yet a further object of the present invention to provide a piezo electric drive arrangement for a harmonic drive transmission by a simple and efficient coupling not found in the art.

BRIEF SUMMARY OF THE INVENTION

The present invention relates to an improved, harmonic drive transmission arrangement driven by an array of piezo elements. The harmonic drive transmission of the present invention has an outer circular spline comprising the output member. The circular spline is of generally cylindrical configuration having a first end with an array of radially inwardly directed teeth, of "N" quantity. A cup-shaped primary flexspline is arranged in a stationary manner within the rotatable, circular spline output member.

The cup-shaped primary flexspline has a first end, defining the open end of the cup-shaped flexspline, having an array of radially outwardly directed teeth, preferably of N-2 in number. The cup-shaped flexspline has a second or closed end having a diaphragm extending thereacross. A hub is centrally arranged across the mid-portion of the diaphragm. A bore is arranged through the hub. The radially outwardly directed teeth on the first or open end of the primary flexspline are arranged to engage the radially inwardly directed teeth on the circular spline at spaced apart locations, according to the deflection apparatus utilized therewith.

A secondary or inner flexspline is arranged radially inwardly of the primary flexspline. The secondary or inner flexspline is of cup shape, having a first end of circular configuration. The secondary or inner flexspline has plurality of longitudinally directed gaps arranged through its outer annular surface, the gaps are also disposed partially across its diaphragm in a radially inwardly directed manner.

Such an arrangement of gaps creates an arrangement of generally L-shaped "fingers" joined around an annular rim encircling its hub at its second or closed end. Each finger has a projection thereon, at its distal-most end, at a radially outer-most location thereon. The hub of the inner secondary flexspline is attached to the hub at the diaphragm of the primary flexspline and is attached therearound by bolts, screws, or the like.

A stationary shaft is arranged through the bore in the circular spline, and extends co-axially through the opening in the hub of the primary flexspline and through the hub of the second inner flexspline. The shaft has an end centrally arranged within the inner flexspline. The primary and secondary flexsplines remain in a non-rotative configuration with respect to the shaft, which is also non-rotative. An end disk is arranged on the distal-most inner end of the shaft. The disk is coaxial with the shaft, and has an array of rod-like, piezo-electric elements extending, in parallel fashion, between the peripheral margin of the end disk and the midpoint of the radial spoke of its radially adjacent finger. The number of piezo-electric elements corresponds to the number of generally L-shaped fingers comprising the secondary flexspline.

Each piezo-electric element is arranged to be in electrical communication with a circuit controlled by a circuit energization control module.

Actuation of the control module is arranged to effect sequential energization of diametrically opposed piezo-electric elements. Introduction of an electrical current through each respective piezo-electric element will effectuate a physical change in the piezo-electric element. The physical change is in its longitudinal dimension, so as to intermittently elongate successive piezo-electric elements as they are sequentially energized.

The elongation of each piezo-electric element effects a slight axially directed bias on the spoke of the flexible finger to which the piezo-electric element is attached (towards the closed ends of the primary and secondary flexsplines). Each flexible finger thus has a spoke portion, which is alternatingly biased toward and away from the rear or second end of the flexspline to which it is attached. The rearward bias of the spoke effects a pivoting of the flexible finger about a thinned, radially inner-most pivot point portion of that spoke, to correspondingly effect a radially outwardly-directed bias of the distal-most tip of the finger against the inner annular side of the primary flexspline.

The primary flexspline at that location, and hence the gear teeth on the radially outward side thereof, are brought into engaging mesh with the radially inwardly directed teeth of, the circular spline. Sequential advancement of the adjacent piezo-electric elements effects successive advancement in radial motion of the protrusions on successively adjacent flexible fingers, thus effects rotative advancement of engaging teeth, inducing rotative motion within the circular spline with respect to the flexspline.

Therefore, the use of dimensionally elongatable piezo-electric elements, which can go through cycles of up to 2,000 fluctuations per second, eliminates the need for a wave generator and its associated bearing assembly, as typically found in the prior art. The piezo-electric elements, having such a high frequency response, permits the harmonic drive transmission assembly to be run at high speed without limits on its lifetime.

BRIEF DESCRIPTION OF THE DRAWINGS

The objects and advantages of the present invention will become more apparent when viewed in conjunction with the following drawing which.

DESCRIPTION OF THE PREFERRED EMBODIMENTS

Figure 1:
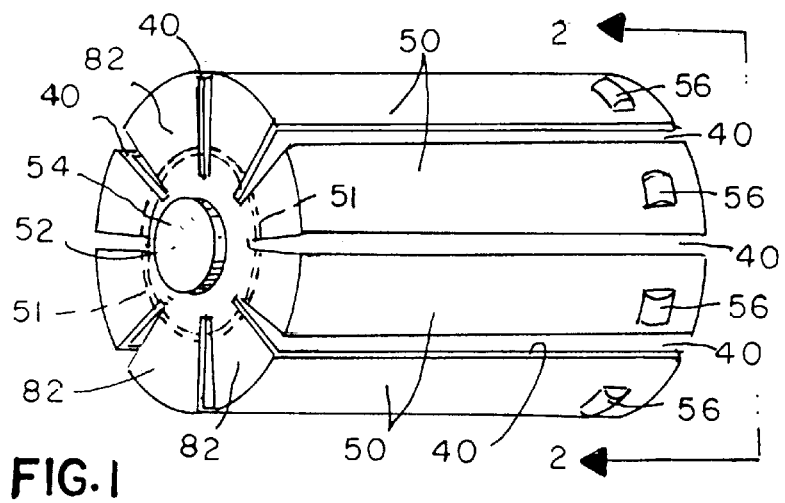
FIG. 1 is a perspective view of an inner flex-spline, having the flexible fingers therewith, constructed according to the principles of the present invention.

Referring to the drawings in detail, and particularly to FIG. 1, there is shown the present invention which relates to an improved, harmonic drive transmission arrangement which is driven by a piezo-electrically powered inner flexspline 10.

Figure 3:
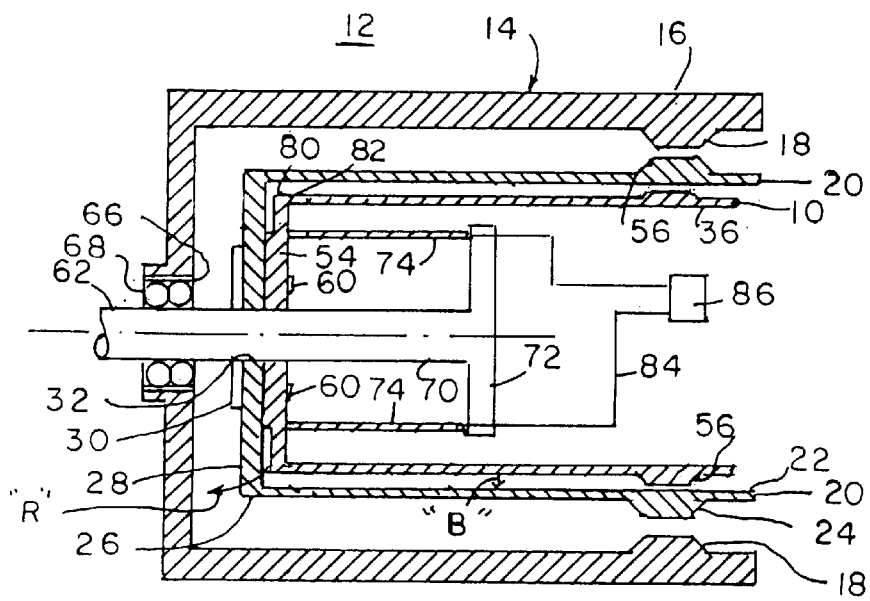
FIG. 3 is a side elevational view, partly in section, of a harmonic drive transmission system showing the piezo-electric elements arranged within the secondary flexspline and the circular spline engaged with the primary flex-spline.

The harmonic drive transmission 12, of the present invention, as shown in section in FIG. 3, has an outer, rigid circular spline 14, which comprises the output member. The circular spline 14 is of generally cylindrical configuration having a first end 16 with an array of radially inwardly directed teeth 18, of "N" quantity. A cup-shaped, primary flexspline 20 is arranged in a stationary manner within the rotatable, circular spline output member 14.

The cup-shaped primary flexspline 20 has a first end 22, defining the open end of the cup-shaped primary flexspline 20, and having an array of radially outwardly directed teeth 24, preferably of N−2 in number. The cup-shaped primary flexspline 20 has a second or closed end 26 having a diaphragm 28 extending thereacross. A hub 30 is centrally arranged across the mid-portion of the diaphragm 28. A bore 32 is arranged through the hub 30. The radially outwardly-directed teeth 24 on the first or open end 22 of the primary flexspline 20 are arranged to engage the radially inwardly directed teeth 18 on the circular spline 14 at spaced apart locations, according to the deflection apparatus utilized therewith.

Figure 2:
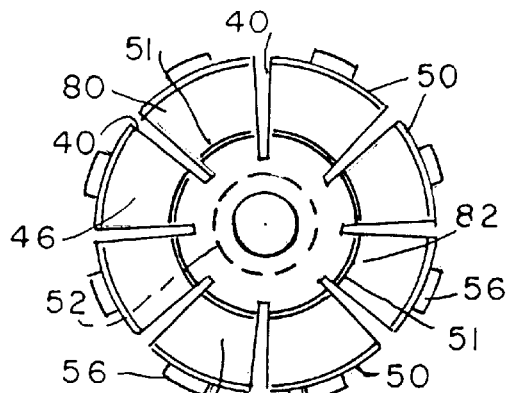
FIG. 2 is a view taken along the lines 2—2 of FIG. 1, showing the radially outwardly directed spokes extending from the hub of the secondary flexspline.

The secondary or inner flexspline 10 is arranged radially inwardly of the primary flexspline 20. The secondary or inner flexspline 10 is of cup shape, having a first or open end 36 of circular configuration. The secondary or inner flexspline 10 has plurality of longitudinally directed gaps 40 arranged through its outer annular surface 42, as shown in FIG. 1, the gaps 40 also disposed partially across its diaphragm 46 in a radially inwardly directed manner, as may also be seen in FIG. 2.

Such an arrangement of gaps 40 creates an arrangement of generally L-shaped "fingers" 50 joined around an annular rim 52 encircling its hub 54 at its second or closed end. Each finger 50 has a projection 56 thereon, at its distal-most end, at a radially outer-most location thereon. The hub 54 of the inner secondary flexspline 10 is attached to the hub 30 at the diaphragm 28 of the primary flexspline 20 and is attached therearound by bolts, screws 60, or the like.

A stationary shaft 62 is arranged through the bore 66 and bearings 68 in the circular spline 14, and extends co-axially through the opening in the hub 30 of the primary flexspline 20 and through the hub 54 of the secondary inner flexspline 10. The shaft 62 has an end 70 centrally arranged within the inner flexspline 10. The primary and secondary flexsplines 10 and 20 remain in a non-rotative configuration with respect to the shaft 62, which is also non-rotative. An end disk 72 is arranged on the distal-most inner end of the shaft 62. The disk 72 is coaxial with the shaft 62, and has an array of elongated, rod-like, piezo-electric elements 74 extending in parallel fashion between the peripheral margin of the end disk 72 and the midpoint 80 of the radial spoke 82 of its radially adjacent finger 50. The number of piezo-electric elements 74 corresponds to the number of generally L-shaped fingers 50 comprising the secondary flexspline 10.

Each piezo-electric element 74 is arranged to be in electrical communication with a circuit 84 controlled by a circuit energization control module 86.

Actuation of the control module 86 is arranged to effect sequential energization of diametrically opposed piezo-electric elements 74. Introduction of an electrical current through each respective piezo-electric element 74 will effectuate a physical change in each respective piezo-electric element 74. The physical change is in its longitudinal dimension, so as to intermittently elongate successive piezo-electric elements 74 as they are sequentially energized.

Figure 3A:
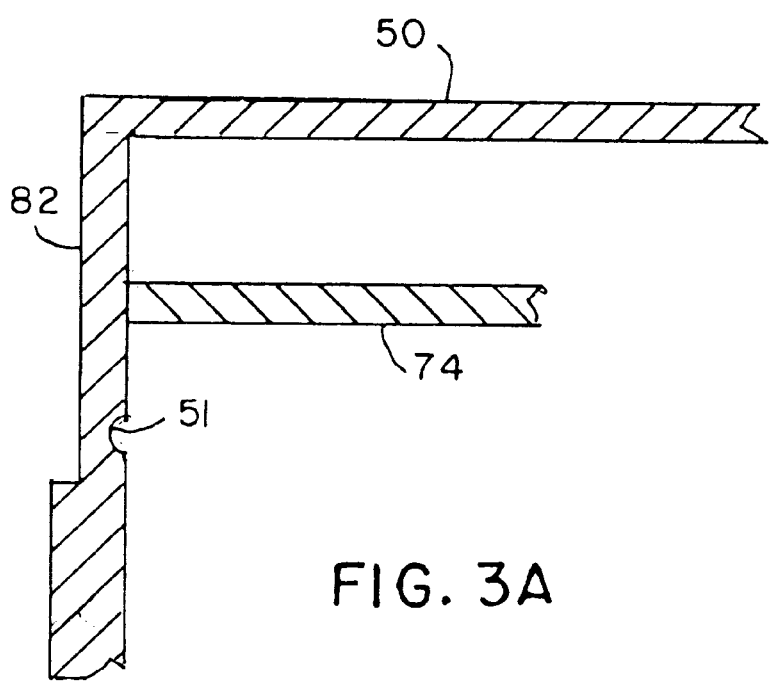
FIG. 3A is an enlarged view of a pinched portion of a radially outwardly directed spoke.

The elongation of each piezo-electric element 74 effects a slight axially directed bias on the spoke 82 of the flexible finger 50 to which the piezo-electric element 74 is attached (towards the closed ends of the primary and secondary flexsplines, as shown by the arrow "R" in FIG. 3. Each flexible finger 50 thus has a thinned or pinched spoke portion 51, as may be seen in FIG. 3A, which pinched portion 51 allows bending thereat, which bending or flexing is alternatingly biased toward and away from the rear or second end of the flexspline 10 to which it is attached. The rearward bias of the spoke 82 effects a pivoting of the flexible finger about of its radially inner-most "pinched" portion 51 of that spoke 82, to correspondingly effect a radially outwardly-directed bias of the distal-most tip 36 of the finger 50 against the inner annular side of the primary flexspline 10, as shown by the arrow "R", in FIG. 3.

The primary flexspline 20 at that location, and hence the gear teeth 24 on the radially outward side thereof, are brought into engaging mesh with the radially inwardly directed teeth 18 of the circular spline 14. Sequential advancement of the adjacent piezo-electric elements 74 effects successive advancement in radial motion of the protrusions 56 on successively adjacent flexible fingers 50, thus effects rotative advancement of engaging teeth 18 and 24, inducing rotative motion within the circular spline 14 with respect to the primary flexspline 20.

Figure 4:
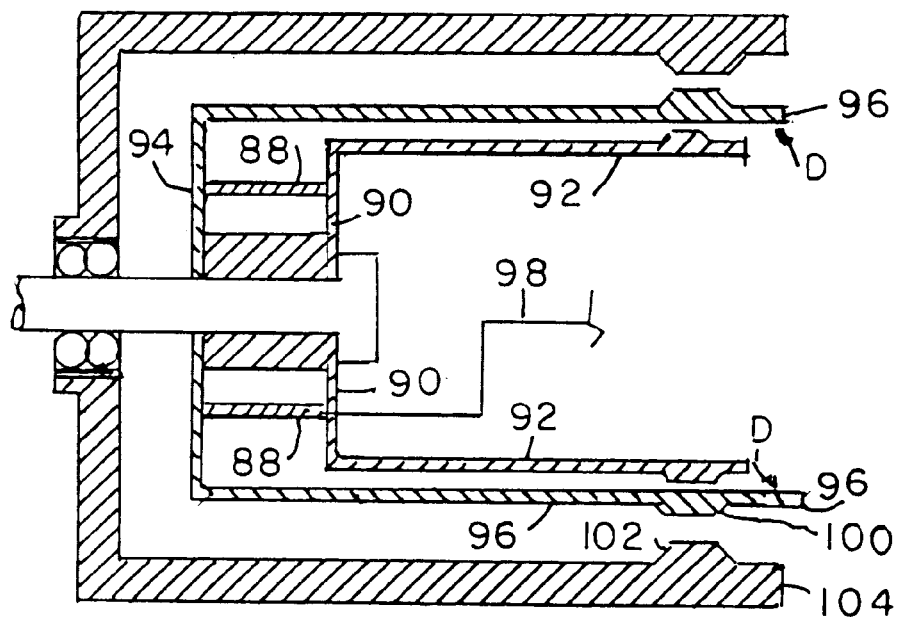
FIG. 4 is side elevational view, partly in section, showing a further embodiment of the piezo-electric elements arranged within the secondary flexspline.

A further embodiment is shown in FIG. 4, wherein an annular array of piezo-electric elements 88 are arranged between a spoke element 90 of a biased flexible finger 92 and the diaphragm 94 of the primary flexspline 96. Each piezo-electric element 88 is in electrically induced elongation until a control circuit 98 is intermittently shut off, permitting rotation "D" of that finger 92 into engagement with the radially adjacent primary flexspline 96, and engagement of the respective teeth 100 and 102 of the flexspline 96 and circular spline 104 respectively.

Therefore, the use of dimensionally elongatable piezo-electric elements 74 and 88, which can go through cycles of up to 2,000 fluctuations per second, eliminates the need for a wave generator and its associated bearing assembly, as typically found in the prior art. The piezo-electric elements, having such a high frequency response, permits the harmonic drive transmission assembly to be run at high speed without limits on its lifetime.

What is claimed is:

1. A method of rotatively empowering an output member of a harmonic drive transmission comprising the steps of:
   arranging a flexspline in radially aligned engagement with a circular spline;
   biasing said flexspline into contact with said circular spline by a first piezo-electric member; and
   biasing said flexspline into contact with said circular spline by a second piezo-electric member to effect rotational advancement of said output member.

2. The method as recited in claim 1, including the step of:
   repeating said biasing of said flexspline by a sequential series of energizations of said piezo-electric members.

3. The method as recited in claim 1 including the step of:
   dividing said circular spline into a series of arcs.

4. The method as recited in claim 3, including the step of:
   dividing said flexspline into a series of arcs in correspondence to said arcs of said circular spline.

5. A harmonic drive transmission for the production of a wide range of speed reduction ratios comprising:
   a circular spline arranged on a shaft;
   a cup shaped flexspline having a lip edge supported radially adjacent said circular spline; and
   a piezo-electric element arranged to bias said lip edge of said flexspline into engagement with said circular spline.

6. A harmonic drive transmission for the production of a wide range of speed reduction ratios as recited in claim 5, wherein said piezo-electric element comprises a plurality of individual piezo-electric fingers engagable with said flexspline.

7. A harmonic drive transmission for the production of a wide range of speed reduction ratios as recited in claim 6, wherein said flexspline is divided into a series of arcuate segments.

8. A harmonic drive transmission for the production of a wide range of speed reduction ratios as recited in claim 6, wherein said circular spline is divided into a series of arcuate segments.

9. A harmonic drive transmission for the production of a wide range of speed reduction ratios as recited in claim 5 wherein said piezo-electric fingers are energized sequentially to effect biasing of said flexspline in a stepwise manner.

\* \* \* \* \*